United States Patent [19]

Keegan et al.

[11] 3,868,432

[45] Feb. 25, 1975

[54] DENTURE ADHESIVE PREPARATION

[75] Inventors: James J. Keegan, Bloomfield; Howard Rubin, Rockaway, both of N.J.; Ram N. Gidwani, Edmonton, Alberta, Canada

[73] Assignee: Warner-Lambert Company, Morris Plains, N.J.

[22] Filed: June 5, 1974

[21] Appl. No.: 476,637

Related U.S. Application Data

[63] Continuation-in-part of Ser. No. 243,816, April 13, 1972, Pat. No. 3,833,518.

[52] U.S. Cl.................. 260/874, 106/35, 260/895, 260/DIG. 36
[51] Int. Cl......................... C08f 29/36, C08f 33/08
[58] Field of Search.............. 260/874, 895, 80.3 N, 260/DIG. 36; 106/35

[56] References Cited
UNITED STATES PATENTS

| 2,997,399 | 8/1961 | Eberhard et al...................... | 106/35 |
| 3,440,065 | 4/1969 | La Via................................. | 106/35 |
| 3,472,840 | 10/1969 | Stone et al...................... | 260/231 R |
| 3,511,791 | 5/1970 | Puetzer et al.................... | 106/35 X |

*Primary Examiner*—Melvin Goldstein
*Assistant Examiner*—W. C. Danison
*Attorney, Agent, or Firm*—Albert H. Graddis; Frank S. Chow; Anne M. Kelly

[57] ABSTRACT

An improved anhydrous denture adhesive is prepared to contain a mixture of a cationic polymeric material and a synthetic anionic gum material as the adhesive ingredient. The mixture may be formulated as a powder or anhydrous paste, which, when applied to dentures and exposed to moisture, develops superior adhesive properties. Suitable cationic materials include at least one of the following: copolymers of substituted or unsubstituted acrylamide with vinyl quaternary ammonium salts, and copolymers of substituted or unsubstituted acrylamide with vinyl and alkyl substituted vinyl pyridinium salts. As the anionic component there may be used at least one synthetic gum which is a copolymer of maleic acid with vinly-lower alkyl-ethers.

8 Claims, No Drawings

DENTURE ADHESIVE PREPARATION

CROSS REFERENCE TO RELATED APPLICATION

This application is a continuation-in-part of U.S. Ser. No. 243, 816, filed Apr. 13, 1972, now U.S. Pat. No. 3,833,518.

BACKGROUND OF THE INVENTION

Traditionally, adherent powders used to secure dentures within the mouth were prepared from such materials as finely powdered natural gums, i.e., karaya, acacia or tragacanth gum. These materials have the particular property of swelling to many times their original volume upon the addition of water to form a gelatinous or mucilaginous mass. Denture adhesive powders may be a combination of one or more natural gums, generally flavored with pleasant tasting volatile oils. Many other additives may also be included, such as antiseptics, stablizers, bactericides, special deodorants, plasticizing agents, fillers, coloring agents, and the like. Cream forms of the denture adherent, prepared from finely ground particles of the natural gums dispersed in a cream base, are also available and may be used instead of the power compositions. In any event, when wet with water, the natural gum in either the cream or powder formulation, expands to become a viscous gel which acts as a cushion and an adherent between the denture plate and the gum tissue.

While these relatively simple formulations are effective in securing dentures within the oral cavity for a short period of time, generally more than one application of the adhesive per day is necessary. This is, at best, inconvenient and therefore, most undesirable.

In recent years, there have been numerous improvements in the above described simple denture adhesive formulations. For example, U.S. Pat. No. 3,003,988, a water insoluble, water-sensitized copolymer is disclosed as the adhesive or stabilizing component of a denture composition. Actually, this patent discloses mixed, partial salts of copolymers of maleic anhydride with lower alkyl-vinyl-ethers, and partial esters of these salts, as the adhesive material. For example, the calcium-sodium partial salts of a partial isopropyl ester of methyl vinyl ether/maleic anhydride copolymer is said to provide a superior denture adhesive.

In U.S. Pat. No. 2,997,399, the principal ingredient of the denture adhesive is a hydroxyethyl cellulose having a certain degree of substitution of ethylene oxide groups per anhydro-glucose unit of the cellulose molecule; preferably, there is also present a lower alkyl ether of cellulose, such as methylether of cellulose, exhibiting temperature-dependent viscosity properties, i.e., showing an increase in viscosity with an increase in temperature. As an optional ingredient in the denture adhesive of U.S. Pat. No. 2,997,399, there may be used a polyacrylamide. This optional ingredient is said to produce an improved "feel, "texture," or "body" in the denture adhesive.

U.S. Pat. No. 3,440,065 discloses still another denture adhesive wherein a powdered, insoluble absorptive cellulose material, such as alpha cellulose, wood flour or microcrystalline cellulose, is incorporated into a gum-petrolatum base adhesive. As the gum in the adhesive, sodium carboxymethyl cellulose, hydroxyethyl cellulose, karaya gum, guar gum, tragacanth and mixtures thereof are suggested.

Another improvement over conventional denture adhesives is claimed in U.S. Pat. No. 3,511,791, which teaches that copolymers of acrylamide and acrylic acid, or homopolymers of acrylamide can form the principle adhesive component in a denture adherent to provide sustained adherence in use without swelling. Whenever a homopolymer of acrylamide, which is nonionic in character, is used, gum karaya is added to the formulation in order to provide a synergistic improvement in gel strength and adhesiveness.

Further, U.S. Pat. No. 3,575,915 discloses a superior denture adhesive containing polyvinyl acetate, water, ethanol, a mineral hydrocolloid, such as colloidal silicate, and a plasticizer.

U.S. Pat. No. 2,978,812 discloses the addition of ethylene oxide homopolymers to denture adhesive gums, including cellulose derivatives, to improve adhesive qualities.

U.S. Pat. No. 3,736,274 discloses a denture adhesive containing three essential ingredients: a maleic anhydride and/or acid copolymer (with a lower alkyl vinyl ether), a polymeric N-vinyl lactam, and sodium carboxymethyl cellulose.

While all of the above denture adhesives provide some improvement over simple formulations containing only finely powdered natural gums, it is generally recognized that no one product has yet been developed which can accommodate, over a long period of time, the many variations in temperature, pH and mechanical agitation which are quite normal in the oral cavity.

It has now been found that the denture adhesive of this invention will provide superior adherent properties over prolonged periods of time and under unusually varied conditions, without the disadvantages characteristic of previously known products.

SUMMARY OF THE INVENTION

An anhydrous denture adhesive comprises a mixture of a cationic polymeric component and an anionic synthetic gum component which, when applied to dentures and exposed to moisture, develops adhesive properties. Suitable cationic materials include at least one of the following: copolymers of substituted or unsubstituted acrylamide with vinyl quaternary ammonium salts; and copolymers of substituted or unsubstituted acrylamide with vinyl and alkyl-substituted vinyl pyridinium salts. As the anionic component there may be used at least one synthetic gum which is a copolymer of maleic acid with vinyl-lower alkyl-ethers. In the preferred products of the invention, the cationic component is a copolymer of acrylamide with a vinyl quaternary ammonium salt.

DESCRIPTION OF THE INVENTION

This invention relates to an anhydrous denture adhesive, which, when in contact with moistened denture plates and the saliva, hydrates within the oral cavity to provide superior adherent properties. The principal adhesive force develops when the mixture of the anhydrous cationic polymeric component and the anhydrous anionic protien material is exposed to moisture. The term cationic polymeric component is meant to include one or more of the following polymeric components:

1 copolymers of an acrylamide having the formula:

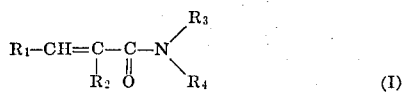

wherein $R_1$ is methyl or hydrogen; and $R_2$, $R_3$, and $R_4$ are each hydrogen or alkyl, with vinyl quaternary ammonium salts including trialkylaminoalkyl acrylate salts, trialkylaminoalkyl methacrylate salts, and vinyloxyalkyltrialkylammonium salts; wherein the alkyl groups are one to seven carbon lower alkyl, preferably one to three carbon lower alkyl;

2. copolymers of an acrylamide having the Formula (I) above with vinyl and alkyl-substituted vinyl pyridinium salts including 2-vinyl pyridinium salts, 4-vinyl pyridinium salts, 2-alkyl-5-vinyl pyridinium salts, and 2-vinyl-5-alkyl pyridinium salts, wherein the alkyl groups are one to seven carbon lower alkyl, preferably one to three carbon lower alkyl.

As the quaternary-forming salts in (1) and (2) above there may be mentioned such non-toxic, quaternary forming salts as alkyliodide, alkylchloride, alkylbromide, and alkyl sulfate salts wherein the alkyl group is a lower alkyl group containing one to seven carbon atoms, preferably one to three carbon atoms. Methyl sulfate salts are particularly preferred. Copolymers of substituted and unsubstituted acrylamide in (1) and (2) above are described in U.S. Pat. Nos. 3,336,269, 3,336,270, and 3,509,113. They are prepared, as described in these last mentioned patents, by a solution polymerization process, wherein an acrylamide monomer having the formula I above and, optionally, an ethylenically unsaturated comonomer, are dissolved in a special solvent (either an acetone-water mixture or an acetonetertiary butanol-water mixture) and polymerized to yield a polymeric product in the form of relatively unswollen, hard, non-tacky granules which can be readily isolated from the polymerization reaction by simple filteration, since the polymeric products are not soluble in the polymerization solvent. The polymerization is carried out in the substantial absence of air and the use of a polymerization initiator is recommended. The polymerization temperature is dependent upon the particular initiator used in the system. The concentrations of solvent and the monomer in the polymerization mixture is critical: for the monomers, 5 – 50 percent (preferably 20 – 35 percent) by weight, based on the weight of the polymerization reaction mixture is recommended; for the acetone-water mixture solvent, 30 – 70 percent (preferably 35 – 50 percent) is used; and for the acetonetertiary butanol-water mixture solvent, 5–65 percent (preferably 30 – 50 percent) is recommended, with the amount of tertiary butanol in this last solvent being 5 – 65 percent (preferably 30 – 50 percent) by weight, based on the weight of the solvent mixture. As is usual for polymerization reactions, the molecular weight of the polymers obtained varies directly with the monomer concentration used in the initial reaction mixture. Monomer concentration should be from 15 – 50 percent, preferably 20 – 35 percent by weight of the total polymerization reaction mixture if high molecular weight polymers are desired. Monomer concentrations above 50 percent yield polymeric products having undesirably large, sticky gel particles. For low molecular weight polymers, monomer concentrations below 10 percent must be used. However, concentrations below 4 – 5 percent are impractical, since a suspension instead of the desired precipitate of the polymer is obtained.

By selecting suitable concentrations of ingredients and polymerization conditions as described in U.S. Pat. Nos. 3,336,269, 3,336,270, and 3,509,113, it has been found to be possible to obtain cationic polymers and copolymers in the form of finely divided powders having molecular weights of from 5 million to 10 million, which are suitable for use as a cationic ingredient in the denture adhesive of this invention. These polymers and copolymers are soluble in warm or cold water and produce clear solutions having viscosities of from 700 to 1800 centipoises, as measured in a 1% aqueous solution of the polymer, at 25°C with a standard Brookfield LVF Viscometer.

Among the above-described types of cationic polymeric materials, the following have been found to be particularly suitable for use in the denture adhesive of this invention:

1. copolymers of acrylamide with vinyl quaternary ammonium salts including trialkylaminoalkyl acrylate salts, trialkylaminoalkyl methacrylate salts, and vinyloxyalkyltrialkylammonium salts, wherein the alkyl groups are one to seven carbon lower alkyl, preferably one to three carbon lower alkyl; and
2. copolymers of acrylamide with vinyl and alkyl-substituted vinyl pyridinium salts including 2-vinyl pyridinium salts, 4-vinyl pyridinium salts, 2-alkyl-5-vinyl pyridinium salts, and 2-vinyl-5-alkyl pyridinium salts, wherein the alkyl groups are one to seven carbon lower alkyl, preferably one to three carbon lower alkyl.

As typical trialkyl aminoalkyl acrylate salt monomers there may be mentioned acryloyloxymethyltrimethyl ammonium methylsulfate; 2-acryloyloxyethyltrimethyl ammonium methylsulfate; 3-acryloyloxypropyltrimethyl ammonium methylsulfate; and acryloyloxymethyltriethyl ammonium ethylsulfate.

As typical trialkylaminoalkyl methacrylate salt monomers there may be mentioned methacryloyloxymethyltrimethyl ammonium methylsulfate; 2-methacryloyloxyethyltrimethyl ammonium methylsulfate; 2-methacryloyloxyethyltriethyl ammonium ethylsulfate; and 3-methacryloyloxpropyltrimethyl ammonium methylsulfate.

As typical vinyloxyalkyltrialkylammonium salt monomers there may be mentioned 2-vinyloxyethyltrimethyl ammonium methylsulfate; 3-vinyloxypropyltrimethyl ammonium methylsulfate; and vinyloxymethyltrimethyl ammonium methylsulfate.

As typical vinyl pyridinium salts there may be mentioned 1-methyl-2-vinyl pyridinium methylsulfate; 1-ethyl-4-vinyl pyridinium ethyl sulfate; 1,2-dimethyl-5-vinyl pyridinium methylsulfate; 1-methyl-2-vinyl-5-ethyl pyridinium methylsulfate; and 1-methyl-2-vinyl-5-propyl-pyridinium methylsulfate.

The amount of each monomeric component in the above-mentioned cationic copolymers utilized in the denture adhesive of the invention may be varied within certain ranges to provide a product suitable for use in the denture adhesive of this invention. Generally, from 50 to 90 percent by weight of the acrylamide type monomer, preferably 63 to 85 percent, most preferably 85 percent by weight, based on the total weight of the copolymer, is used. Correspondingly, from 10 to 50 percent by weight of the vinyl quaternary ammonium salt (or the vinyl pyridinium salt) comonomer, preferably 15 to 37 percent, most preferably 15 percent by weight, based on the total weight of the copolymer, is used.

The preferred cationic component for the denture adhesive of this invention is a copolymer of acrylamide with one of the abovementioned vinyl quaternary ammonium salts.

In a most preferred embodiment of this invention, the cationic component comprises 85 percent by weight of acrylamide and 15 percent by weight of a trialkylaminoalkyl methacrylate salt having one to three carbon atoms in the alkyl group, i.e., 2-methacryloyloxyethyltrimethyl ammonium methylsulfate, based on the total weight of the copolymer.

As the anionic material in the denture adhesive of this invention, there may be used one or more synthetic gums which are copolymers of maleic acid with vinyl-lower alkyl-ethers having from one to five carbon atoms in the lower alkyl group.

Maleic anhydride/vinyl-alkyl-ether copolymers are described in U.S. Pat. No. 2,047,398, patented July 14, 1936 and in U.S. Pat. No. 2,782,182, patented on Feb. 19, 1957. The alkyl group in the vinyl ether may contain from one to five carbon atoms. Suitable lower alkyl vinyl ether monomers include methyl vinyl ether, ethyl vinyl ether, divinyl ether, propyl vinyl ether, isobutyl-vinylether and the like. Polymerization techniques used to obtain these copolymers are those well known in the art, i.e., utilizing appropriate proportions of monomers and reaction conditions. The mole ratio of the total of ether monomers to the total of maleic anhydride is substiantial unity: polymerization of one mole of alkyl vinyl ether with one mole of maleic anhydride. This anhydride copolymer should be hydrolyzed to the free acid form for use in the denture adhesive of this invention; monovalent, alkali metal salts thereof may also be used. Copolymers of this type have been found to be gum-like and have anionic characteristics and may therefore be used as the anionic component in the denture adhesive of this invention.

Among the suitable anionic materials described above, one or more of the synthetic gums marketed commercially as GANTREZ HY by General Aniline and Film Corp., New York, N.Y. 10020 have been found to be especially effective in the denture adhesive of this invention. These gums are poly(methyl vinyl ether/maleic acid) compounds having a specific viscosity of from 1 to 8.

The denture adhesive of this invention may be formulated to contain the cationic polymer and the anionic gum in either powder or paste form. In the powder formulation, the two anhydrous, particulate, components are admixed with the usual flavors and colorants in the following proportions: for the cationic polymer, from 1 to 80 percent, preferably from 3 to 50 percent by weight, based on the weight of the total formulation is suitable; for the anion source, from 20 percent to 99 percent, preferably from 30 to 90 percent, by weight, based on the weight of the total formulation may be used. Other ingredients such as non-toxic anti-caking agents, (silica, magnesium stearate, talcum powder or the like) may also be included. The mixture of ingredients is thoroughly agitated or stirred to yield a generally homogenous intermixing of all components.

In the paste formulations, the cationic polymer and the anionic gum are admixed with petrolatum, mineral, animal or vegetable oils, and the like, along with flavors, colorants and certain commonly used preservatives and fillers.

A particularly preferred paste or cream formulation is prepared by utilizing as the cream or paste base, the product of U.S. Pat. No. 3,215,599. The cream or paste base of this patent is characterized as a mixture of white petroleum oil with a minor amount of a polyethylene wax having an average molecular weight of 1,000 to 20,000. This product is described as having emollient properties, useful in the formulation of medicaments where absorption of the medicament by the skin is of paramount importance. Denture adhesive creams formulated with this petroleum oil/polyethylene wax blend as the paste or cream base display unusually good stability, extrudability and product appearance. The successful use of a "cosmetic" or "medicinal" vehicle in the denture adhesive of the invention, to provide a cream formulation of improved properties is most unexpected.

Concentrations of ingredients in a cream or paste denture adhesive are as follows: for the cationic polymer, from 1 to 40 percent, preferably 5 to 25 percent by weight based on the weight of the total formulation; for the anion source, from 15 to 50 percent, preferably 25 to 40 percent by weight based on the weight of the total formulation; and for the cream base, from 30 to 65 percent, preferably 40 to 60 percent by weight, based on the weight of the total formulation. In the aforementioned particularly preferred cream formulation utilizing the petroleum oil with polyethylene wax blend of U.S. Pat. No. 3,215,599, the petroleum oil and the polyethylene wax are used in amounts of from 3 to 20 percent, preferably 5 to 15 percent of polyethylene wax and 80 to 97 percent, preferably 85 to 95 percent by weight of petroleum oil, based on the total weight of the cream or paste base in the denture adhesive formulation.

Whether formulated as a powder or paste, the denture adhesive mixture of this invention, when applied to dentures and exposed to moisture, hydrates to form an adhesive combination markedly superior to prior art, preformed adhesive materials.

In order to further illustrate this invention, the following examples are given:

EXAMPLE 1

Preparation of Denture Adhesive Cream

A. Weigh 217.6 pounds of heavy mineral oil into a steamjacketed Hobart mixer and heat to 90°C. At 90°C. add 32.4 pounds of a polyethylene wax of average molecular weight 2,000, and disperse the wax thoroughly in the mineral oil while force cooling the batch to 70°C during mixing. At 70°C, add 0.50 pounds of methyl paraben and 0.50 pounds of propyl paraben, and mix well, while force cooling the batch to 45°C.

B. In a Hobart mixer, add 62.5 pounds of a copolymer of 85 percent by weight acrylamide with 15 percent by weight $\beta$-methacryloyloxyethyltrimethyl ammonium methyl sulfate; 62.5 pounds of a methylvinylether/maleic acid copolymer; and 0.50 pounds of FD and C Red No. 3 Lackolene (19 percent pure dye); mix these dry ingredients until complete blending is achieved. At 45°C, add B to A and mix for about 15 minutes with the Hobart blades.

C. Add 0.50 pounds of peppermint oil, U.S.P. to the mixture of A and B and Mix at a high speed until a homogeneous cream is obtained.

EXAMPLE 2

Preparation of Denture Adhesive Cream

A denture adhesive cream is prepared from the following ingredients:

| | | |
|---|---|---|
| Polyvinyl alcohol | 125.0 | pounds |
| Copolymer of acrylamide and methacryloyloxymethyltrimethyl ammonium methyl sulfate | 62.5 | pounds |
| Copolymer of methyl vinyl ether and maleic acid | 62.5 | pounds |
| Petrolatum | 149.0 | pounds |
| Mineral Oil | 100 | pounds |
| Propyl Paraben | 0.50 | pounds |
| Methyl Paraben | 0.50 | pounds |
| F.D. & C. Red No. 3 Aluminum Lake | 0.50 | pounds |
| Imitation Pepperment Oil | 0.50 | pounds |

The petrolatum and mineral oil are added to a steam-jacketed mixture and heated to 70°C. At 70°C, the methyl paraben and propyl paraben are added and the mixture is forcecooled at 45°C. The procedure of Example 1, parts B and C, is followed for all of the remaining ingredients.

EXAMPLE 3

Preparation of Denture Adhesive Powder

A denture adhesive powder is prepared to contain the following ingredients:

| | | |
|---|---|---|
| Copolymer of acrylamide and γ-methacryloyloxypropyltrimethyl ammonium methyl sulfate | 150 | pounds |
| Copolymer of methylvinylether and maleic acid | 848 | pounds |
| Micronized silica | 1 | pound |
| Peppermint Oil | 1 | pound |

The peppermint oil is well dispersed in about 25 pounds of the copolymer of methylvinylether and maleic anhydride.

The micronized silica is similarly dispersed in about 25 pounds of the copolymer of methylvinylether and maleic anhydride.

The two premixes are then added to the balance of the copolymer of methylvinylether and maleic anhydride which has previously been placed in a ribbon blender mixing apparatus. The whole is then mixed for about 15 minutes, after which the 150 pounds of the acrylamide copolymer is added and the batch mixed for an additional 15 minutes.

EXAMPLE 4

Preparation of Denture Adhesive Powder

A denture adhesive powder is prepared according to the procedure of Example 3, from the following ingredients:

| | | |
|---|---|---|
| Copolymer of acrylamide and β-methacryloyloxymethyltrimethyl ammonium methyl sulfate | 9.0 | pounds |
| Copolymer of methylvinylether and maleic acid | 90.9 | pounds |
| Spearmint Oil | 0.05 | pounds |
| Peppermint Oil | 0.05 | pounds |

We claim:

1. A denture adhesive comprising a substantially anhydrous mixture of:

A. from about 1.0 to about 80 percent by weight, based on the total weight of the denture adhesive, of at least one cationic polymeric material selected from the group consisting of:

1. a copolymer of an acrylamide having the formula:

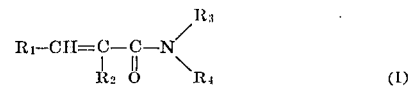

wherein $R_1$ is methyl or hydrogen; and $R_2$, $R_3$, and $R_4$ are each hydrogen or one to seven carbon lower alkyl, with a vinyl quaternary ammonium salt selected from the group consisting of trialkylaminoalkyl acrylate salts, trialkylaminoalkyl methacrylate salts, and vinyloxyalkyltrialkylammonium salts, wherein the alkyl group contains from one to seven carbon atoms; and 2. a copolymer of an acrylamide having the formula (I) above with a vinyl or alkyl-substituted vinyl pyridinum salt, wherein the alkyl group is one to seven carbon lower alkyl; and B. from about 20 to about 99 percent by weight, based on the total weight of the denture adhesive, of at least one anionic gum selected from the group consisting of copolymers of maleic acid with vinyl-lower alkyl-ether wherein the alkyl group has from one to five carbon atoms.

2. A denture adhesive according to claim 1 wherein the cationic polymeric material is a copolymer of acrylamide with a vinyl quaternary ammonium salt selected from the group consisting of trialkylaminoalkyl acrylate salts, trialkylaminoalkyl methacrylate salts, and vinyloxyalkyltrialkylammonium salts wherein the alkyl group contains from one to three carbon atoms.

3. A denture adhesive according to claim 2 comprising a substantially anhydrous mixture of from about 3.0 to about 50 percent by weight of the cationic polymeric material, and from about 30 to about 90 percent by weight of the anionic gum.

4. A denture adhesive according to claim 3 wherein the anionic gum is a copolymer of methylvinylether with maleic acid.

5. A denture adhesive according to claim 4 wherein the cationic polymeric material is a copolymer of acrylamide with a trialkylaminoalkyl methacrylate salt having from one to three carbon atoms in the alkyl group.

6. A denture adhesive according to claim 1 which additionally contains from about 10 to about 75 percent by weight, based on the weight of the total denture adhesive compositions of non-toxic, powdered, excipient materials.

7. A denture adhesive according to claim 1 which additionally contains from about 30 to about 75 percent by weight, based on the weight of the total denture adhesive composition of at least one cream base material selected from the group consisting of petrolatum, natural and synthetic oils.

8. A denture adhesive according to claim 1 which additionally contains from about 30 to about 75 percent by weight, based on the weight of the total denture adhesive composition, of a cream base material which is a combination of mineral oil with a minor amount of a polyethylene wax having a molecular weight of 1,000 to 20,000.

* * * * *